United States Patent [19]
Hahn et al.

[11] Patent Number: 5,882,167
[45] Date of Patent: Mar. 16, 1999

[54] LOCKING MECHANISM FOR A VEHICLE RESTRAINT

[75] Inventors: Norbert Hahn, Franklin; Michael A. Swessel, Cudahy, both of Wis.

[73] Assignee: Rite-Hite Holding Corporation, Milwaukee, Wis.

[21] Appl. No.: 842,163

[22] Filed: Apr. 23, 1997

[51] Int. Cl.⁶ .................................................. B65G 69/00
[52] U.S. Cl. .......................... 414/401; 414/396; 414/584
[58] Field of Search ........................ 414/401; 294/82.33, 294/396, 548

[56] References Cited

U.S. PATENT DOCUMENTS

| | | | |
|---|---|---|---|
| Re. 33,242 | 6/1990 | Hipp et al. | 414/401 |
| 2,722,449 | 11/1955 | Harley | 294/82.33 |
| 4,208,161 | 6/1980 | Hipp et al. | 414/401 |
| 4,267,748 | 5/1981 | Grunewald et al. | 74/529 |
| 4,282,621 | 8/1981 | Anthony et al. | 14/71.1 |
| 4,373,847 | 2/1983 | Hipp et al. | 414/401 |
| 4,379,354 | 4/1983 | Hahn et al. | 414/401 |
| 4,472,099 | 9/1984 | Hahn et al. | 414/401 |
| 4,560,315 | 12/1985 | Hahn | 414/401 |
| 4,605,353 | 8/1986 | Hahn et al. | 414/401 |
| 4,648,781 | 3/1987 | Sikora | 414/401 |
| 4,759,678 | 7/1988 | Hageman | 414/401 |
| 5,096,359 | 3/1992 | Alexander | 414/401 |
| 5,297,921 | 3/1994 | Springer et al. | 414/396 |
| 5,340,181 | 8/1994 | Matsuyama | 294/82.33 |
| 5,348,437 | 9/1994 | Krupke et al. | 414/401 |

OTHER PUBLICATIONS

4 Sheets drawings/text from Rite–Hite Corporation: "G3 POSI–LOK SDL900 (less controls)"; Drawing #1262; Drawing #56158; dated Sep. 1989–Dec. 1989.

*Primary Examiner*—Thomas J. Brahan

[57] ABSTRACT

A vehicle restraint is provided for releasably securing a parked vehicle to an adjacent structure. The vehicle restraint includes a carriage assembly which is adjustably vertically mounted to the adjacent structure and a restraining member which is pivotally attached to the carriage assembly for rotational movement between a stored (or vehicle-release) position, wherein the restraining member is enclosed within the carriage assembly, and an operative (or vehicle-locking) position, wherein a portion of the restraining member projects outwardly and upwardly from the carriage assembly. The vehicle restraint also includes a locking mechanism for preventing rotation of the restraining member into the stored position when an external force or torque, in a direction toward the stored position, is exerted on the distal end of the restraining member. The locking mechanism includes a first locking member which is attached to the restraining member, and a second locking member which is attached to the carriage assembly and is positioned for selective engagement by the first locking member when the restraining member is rotated between the operative and stored positions. In use, engagement between the first and second locking members prevents rotation of the restraining member into the stored position when the external force or torque is exerted on the distal end of the restraining member.

7 Claims, 10 Drawing Sheets

LOCKING MECHANISM FOR A VEHICLE RESTRAINT

FIELD OF THE INVENTION

The present invention relates generally to vehicle restraints for releasably securing a parked vehicle to a loading dock and, more particularly, to a locking mechanism for preventing the inadvertent release of such vehicle restraints.

BACKGROUND OF THE INVENTION

During the loading or unloading of a parked truck, trailer, or other vehicle at a loading dock, it is important from a safety standpoint to secure the truck in place so as to prevent accidental movement away from the loading dock while personnel and material handling equipment (e.g., dollies, carts, fork lifts, etc.) are transporting material between the truck and loading dock. Inadvertent or premature separation of the truck from the loading dock can create a hazardous situation since a gap then exits between the truck and the loading dock.

In accordance with governmental regulations, a safety bar, commonly referred to as an ICC (Interstate Commerce Commission) bar or rear-impact guard, is mounted to the rear end of most trucks. The purpose of the ICC bar is to prevent a low profile vehicle from passing under the read end of the truck when involved in a rear end collision. An additional use of the ICC bar is to restrain or secure a parked truck to a loading dock by engaging the ICC bar of the truck. Such vehicle restraints are disclosed, for example, in U.S. Pat. Nos. 4,282,621 (Anthony et al.), 4,373,847 (Hipp et al.), 4,379,354 (Hahn et al.), 4,443,150 (Hahn et al.), 4,472,099 (Hahn et al.), 4,560,315 (Hahn), and 4,605,353 (Hahn et al.).

Figure 1:
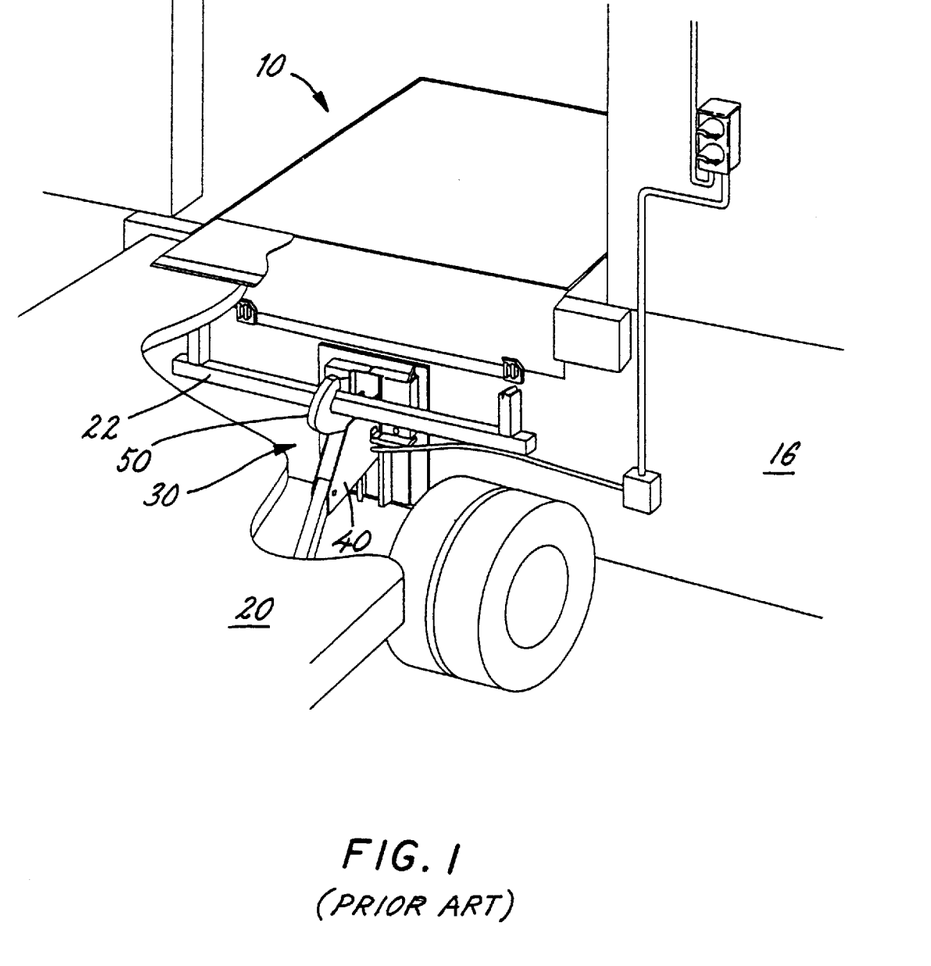
FIG. 1 is a perspective view of a previously described, prior art vehicle restraint shown mounted to a loading dock and securing a truck thereto.
Figure 2:
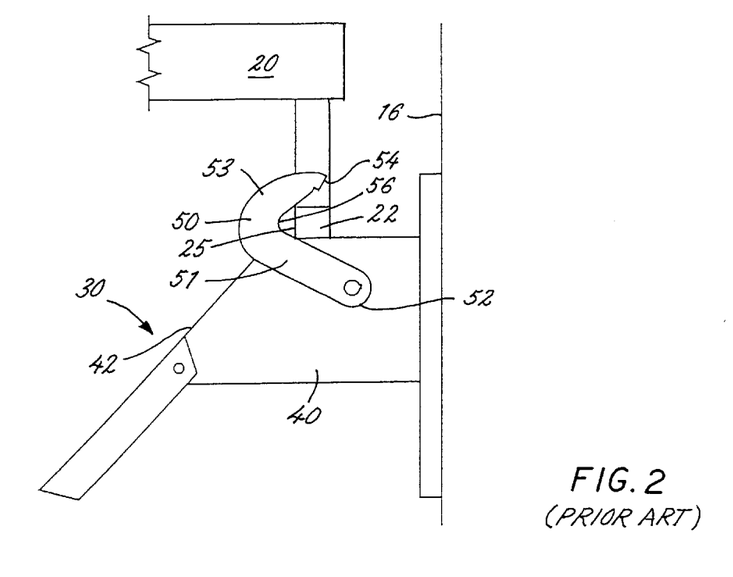
FIG. 2 is a partial fragmentary side elevational view of the truck, loading dock, and vehicle restraint depicted in FIG. 1, showing a restraining member of the vehicle restraint in an operative or vehicle-locking position and interlockingly engaging an ICC bar or rearimpact guard of the truck.
Figure 3:
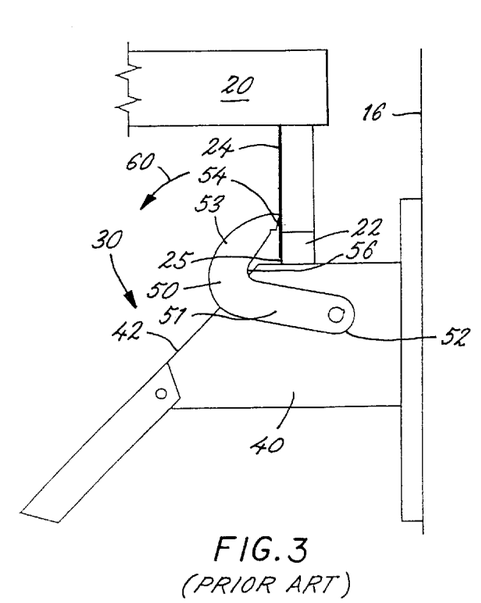
FIG. 3 is a partial fragmentary side elevational view of the truck, loading dock, and vehicle restraint depicted in FIG. 1, showing the restraining member non-interlockingly engaging the ICC bar of the truck.
Figure 4:
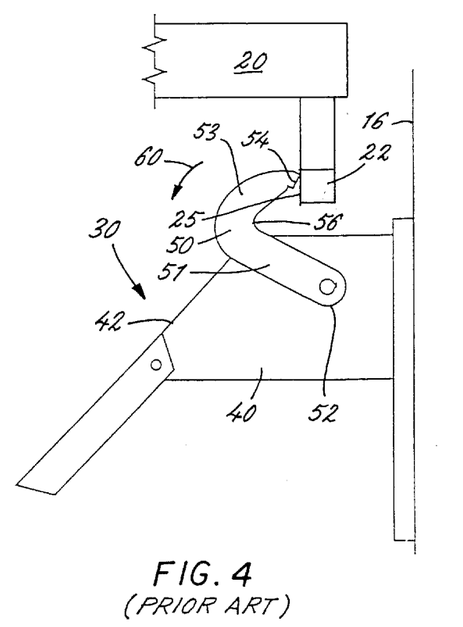
FIG. 4 is a partial fragmentary side elevational view of the truck, loading dock, and vehicle restraint depicted in FIG. 1, showing the restraining member non-interlockingly engaging a cover plate mounted over the ICC bar of the truck.

As shown in FIGS. 1–4 of the drawings, one style of conventional vehicle restraint 30 includes a carriage assembly 40 which is adjustably mounted for substantially vertical movement with respect to a front wall 16 of a loading dock 10, a generally hook-shaped restraining member 50 which is housed within the carriage assembly 40 and is pivotably attached thereto via a shaft (not shown), and a motor (not shown) for selectively rotating the shaft and the attached restraining member 50. As is customary, the restraining member 50 includes a shank portion 51 with a proximal end 52, a leg portion 53 with a free distal end 54, and a throat portion 56 disposed between the shank portion 51 and the leg portion 53. As shown in FIGS. 2–4, the leg portion 53 of the restraining member 50 extends at an angle from the shank portion 51 to form the hook-like shape. In order to protect the motor, the shaft is provided with a slip clutch (not shown) which allows the shaft to rotate against the motor when an external force above a predetermined magnitude and tending to rotate the restraining member 50 (i.e., a "torque" 60) is exerted on the restraining member 50. Also, the carriage assembly 40 is biased to assume a first vertical position, but may be moved downwardly into a lower vertical position when an external force (such as that provided by the ICC bar 22 of a truck 20 which is moving backwardly towards the loading dock 10) is exerted on an exposed cam surface 42 of the carriage assembly 40.

In order to releasably secured a parked truck 20 to the loading dock 10, the restraining member 50 is rotatable between an operative (or vehicle-locking) position and a stored (or vehicle-release) position. In the operative position, the restraining member 50 protrudes outwardly and upwardly from the carriage assembly 40, preferably to a position wherein the distal end 54 of the restraining member 50 extends up and over the restrained ICC bar 22 of a truck 20 so as to effectively trap the ICC bar 22 in the throat portion 56 of the restraining member 50, as shown, for example, in FIG. 2. When the restraining member 50 interlockingly engages the ICC bar 22 in this way, the ICC bar 22 is, in effect, "trapped" or "hooked" by the restraining member 50. That is, when the ICC bar 22 moves away from the loading dock 10, the restraining member 50 is pulled into tighter engagement with the ICC bar 22, thus providing a restraint to prevent the truck from inadvertently moving away from the loading dock 10. In the stored position, on the other hand, the restraining member 50 is fully retracted within the carriage assembly 40, and the truck 20 is free move away from the loading dock 10.

Certain circumstances, however, may prevent the restraining member 50 from interlockingly engaging the ICC bar 22 in this manner. For example, if the ICC bar 22 is located above the first vertical position of the carriage assembly 40 such that the distal end 54 (and not the throat portion 56) of the restraining member 50 engages the front vertical surface 25 of the ICC bar 22, as shown in FIG. 3 (instead of extending up and over this surface, as shown in FIG. 2), movement of the truck 20 away from the loading dock 10 subjects the restraining member 50 to an external force 60 which tends to rotate the restraining member 50 in a direction toward the stored position. Because of the slip clutch, such a force 60 may cause the restraining member 50 to rotate toward the stored position and cause the restraining member 50 to become fully disengaged from the ICC bar 22 of the truck 20. Should this occur, the truck 20, of course, would no longer be secured to the loading dock 10.

Similarly, if a cover plate 24 is mounted in front of the ICC bar 22, as shown in FIG. 4, interlocking engagement between the restraining member 50 and the ICC bar 22 of the truck 20 is prevented because the distal end 54 of the restraining member 50 cannot get up and over the ICC bar 22. Although the distal end 54 of the restraining member 50 engages (i.e., merely touches) the cover plate 24, movement of the truck 20 away from the loading dock 10 subjects the restraining member 50 to an external force 60 which tends to rotate the restraining member 50 out of the operative position. If the distal end 54 fails to bite into the cover plate 24, the truck 20 could be inadvertently moved or driven away from the loading dock 10.

OBJECTS OF THE INVENTION

Accordingly, a general object of the present invention is to provide a locking mechanism for a vehicle restraint which prevents rotation of the restraining member from the operative (or vehicle-locking) position when an external force or torque is applied to the restraining member.

A related object of the present invention is to provide a locking mechanism for a vehicle restraint which prevents rotation of the restraining member into the stored (or vehicle-release) position when an external force or torque, in a direction toward the stored position, is exerted on the restraining member.

A more specific object of the present invention is to provide a vehicle restraint which reliably secures a parked truck to a loading dock even when the restraining member is unable to interlockingly engage (or hook) the ICC bar (or rear-impact guard) of the truck.

A related object of the present invention is to provide a vehicle restraint which reliably secures a parked truck to a loading dock even when there is non-interlocking engagement between the distal end of the restraining member and the ICC bar or ICC cover plate of the truck.

Another object of the present invention is to provide a vehicle restraint having the foregoing characteristics which is reliable, durable, and convenient to use.

These and other objects, features, and advantages of the present invention will become apparent upon reading the following detailed description of a preferred exemplified embodiment and upon reference to the accompanying drawings.

SUMMARY OF THE INVENTION

Accordingly, a vehicle restraint having an adjustable vertically-mounted carriage assembly and a pivotably attached restraining member is provided with a locking mechanism which reliably locks the restraining member in place. The restraining member is pivotably movable between a stored (or vehicle-release) position and an operative (or vehicle-locking) position. In the stored position, the restraining member is substantially enclosed within or concealed by the carriage assembly. In the operative position, at least a portion of the restraining member protrudes outwardly from the carriage assembly for the purpose of engaging the ICC bar of a truck or other vehicle. In use, the locking mechanism reliably prevents the restraining member from rotating out of the operative position when an external force or torque, in a direction toward the stored position, is exerted on the restraining member.

The locking mechanism of the present invention includes a first locking member which is coupled to the restraining member, and a second locking member which is coupled to the carriage assembly and is positioned for selective engagement by the first locking member when the restraining member is rotated by an external force or torque between the operative and stored positions. In use, engagement between the first and second locking members prevents rotation of the restraining member into the stored position when the distal end of the restraining member is subjected to an external force or torque in a direction toward the stored position.

In one embodiment of the locking mechanism, the first locking member is in the form of a collar pivotably attached to the restraining member, and the second locking member is in the form of a member with engaging surfaces or ratchet teeth fixedly attached to the carriage assembly. More specifically, the first locking member includes front and rear ends and is movable between a deactivated (or default) position and an activated position. In the deactivated position, the front end of the first locking member is spaced from the distal end of the restraining member, and the restraining member is free to rotate between the operative and stored positions because there is clearance between the rear end of the first locking member and the teeth of the second locking member. In the activated position, however, the front end of the first locking member is substantially flush with the distal end of the restraining member, and the restraining member is prevented from freely rotating between the operative and stored positions because the rear end of the first locking member engages the teeth of the second locking member and positionally locks the restraining member in place as it rotates from the operative position towards the stored position. The first locking member is movable from the deactivated position towards the activated position when, for example, the front end of the first locking member is engaged by the ICC bar and/or cover plate of a truck moving inadvertently away from the loading dock.

In another embodiment of the locking mechanism, the first locking member is in the form of a pin fixedly mounted to the restraining member, and the second locking member is in the form of a member with engaging surfaces or ratchet teeth pivotably attached to the carriage assembly. In use, the second locking member is movable between an extended position and a retracted position. The second locking member is normally biased towards the extended position by a biasing member such as a spring, but is movable into the retracted by an actuator which acts against this biasing. When the second locking member is in the retracted position, the restraining member is free to rotate between the operative and stored positions because there is clearance between the pin of the first locking member and the teeth of the second locking member. When the second locking member is in the extended position and the restraining member is in the operative position, however, the pin of the first locking ember engages the teeth of the second locking member and positionally locks the restraining member in place.

BRIEF DESCRIPTION OF THE DRAWINGS

In the drawings, wherein similar reference numerals denote similar elements throughout the several views.

While the present invention will be described and disclosed in connection with certain preferred embodiments and procedures, the intent is not to limit the present invention to these specific embodiments. On the contrary, the intent is to cover all such alternatives, modifications, and equivalents that fall within the spirit and scope of the present invention as defined by the appended claims.

DETAILED DESCRIPTION OF THE PREFERRED EMBODIMENTS

Turning now to the drawings, a vehicle restraint constructed in accordance with the teachings of the present invention for releasably securing a parked truck 20 or other vehicle to an adjacent structure such as a loading dock 10 is generally designated by reference numeral 100. As is customary in the art, the loading dock 10 includes a roadway surface 12 which supports the truck 20, a generally horizontal platform surface 14 which is elevated relative to the roadway surface 12, and a generally vertical front wall 16 which extends between the roadway surface 12 and the platform surface 14. When the truck 20 is parked at the loading dock 10 for the loading and/or unloading of cargo, the vehicle restraint 100 advantageously secures the truck 20 to the loading dock 10 by interlockingly engaging or hooking a transversely extending ICC (Interstate Commerce Commission) bar or rear-impact guard 22 of the truck 20, as shown, for example, in FIGS. 5 and 7. Once secured, the truck 20 is restrained from accidentally moving away from the loading dock 10 while the truck 20 is being loaded or unloaded. The loading dock 10 may also be provided with dock leveling equipment 18 as disclosed, for example, in U.S. Pat. No. 4,110,860, issued Sep. 5, 1978.

As is customary in the art, the vehicle restraint 100 includes a mounting assembly 110 which is fixedly attached to the front wall 16 of the loading dock 10, a carriage assembly 120 which is adjustably mounted on the mounting assembly 110 for substantially vertical movement with respect to both the mounting assembly 110 and the front wall 16, and a substantially hook-like restraining member 140 which is pivotably attached to the carriage assembly 120.

Figure 5:
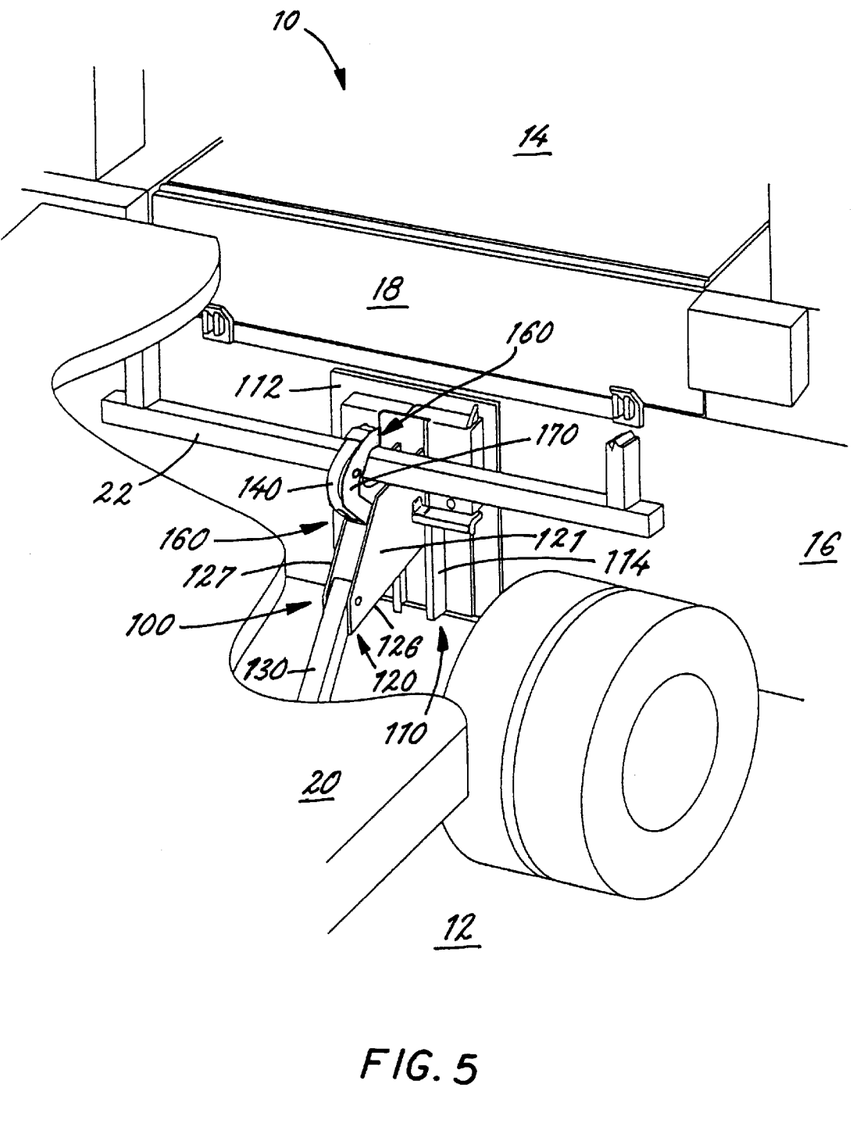
FIG. 5 is a perspective view of a vehicle restraint in accordance with the present invention, showing the restraining member of the vehicle restraint in an operative or vehicle-locking position and interlockingly engaging the ICC bar of a truck.
Figure 7:
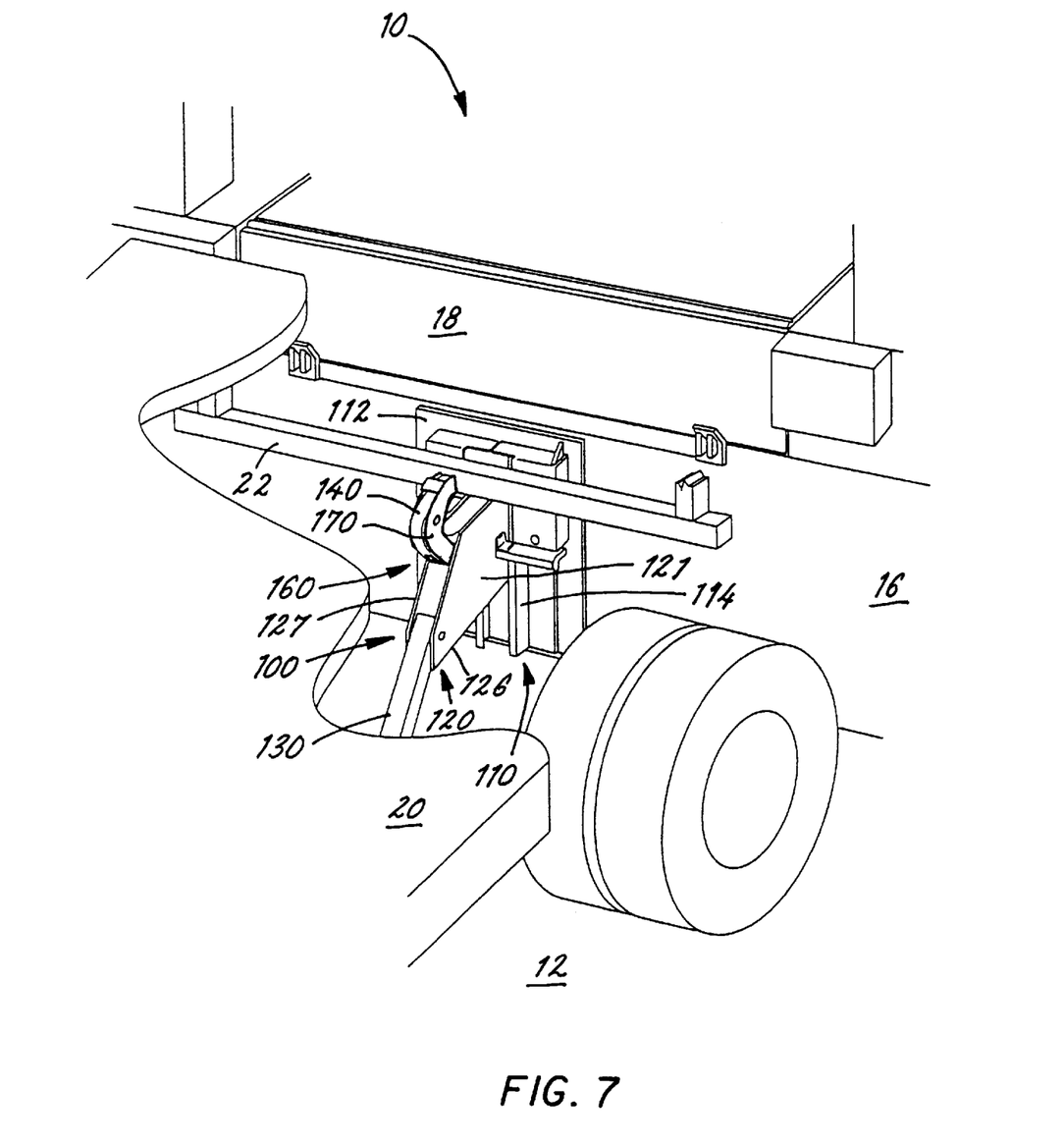
FIG. 7 is a perspective view of the vehicle restraint depicted in FIG. 5, showing the restraining member non-interlockingly engaging the ICC bar of the truck and the locking mechanism preventing rotation of the restraining member into the stored position.

As shown in the illustrated embodiment, the mounting assembly 110 may include a substantially planar mounting plate 112 which is affixed to the front wall 16 of the loading dock 10 by a plurality of anchoring bolts or the like (not shown), and a pair of opposed and vertically arranged guide tracks 114 which are fixedly attached to the mounting assembly 110. As shown in FIGS. 5 and 7, the guide tracks 114 are specifically adapted to receive the carriage assembly 120.

Figure 9:
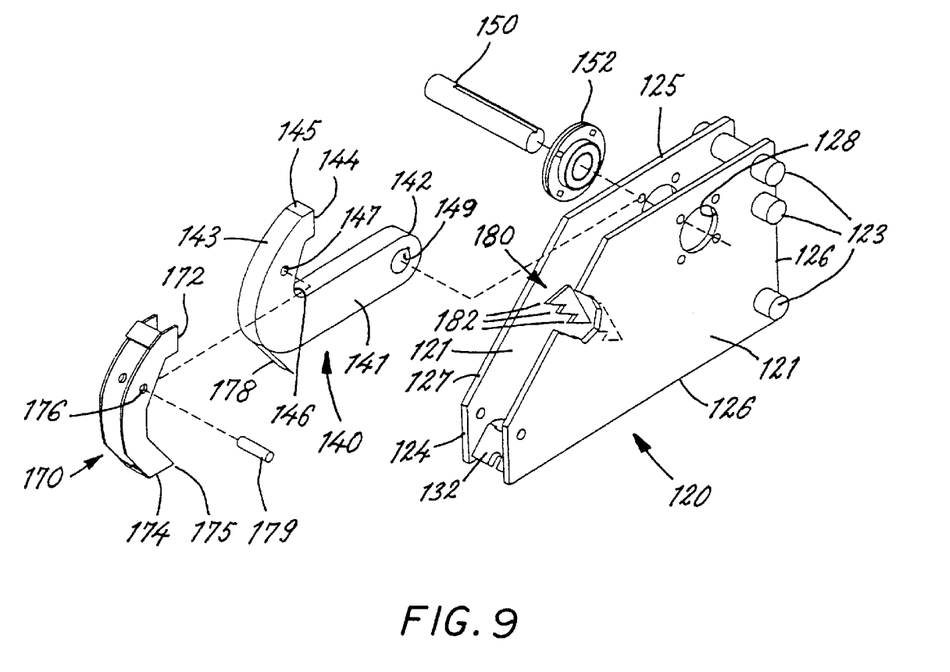
FIG. 9 is an exploded perspective view of the vehicle restraint and locking mechanism depicted in FIGS. 5–8.

The carriage assembly 120 of the vehicle restraint 100 includes a frame which is formed by a pair of similarly shaped, spaced-apart side plates 121. As best shown in FIG. 9, each side plate 121 includes an aft end 122, a forward end 124, upper and lower surfaces 125 and 126, and an exposed inclined cam surface 127 which slopes downwardly from the upper surface 125 to the forward end 124. In order to enable the carriage assembly 120 to move vertically with respect to the mounting assembly 110, a plurality of aligned shafts 123 are provided at the aft end 122 of the carriage assembly 120, each having suitable rollers (not shown), for engaging the vertical guide tracks 114 of the mounting assembly 110. The carriage assembly 120 is biased upwardly within the guide tracks 114 to assume a first vertical position by springs or the like (not shown). When the truck 20 moves backwardly with respect to the front wall 16 of the loading dock 10 toward a parked position, the ICC bar 22 of the truck 20 usually engages the exposed cam surfaces 127 and exerts an external force thereon which causes the carriage assembly 120 to move downwardly from the first vertical position towards a lower operable position (i.e., disposed closer to the roadway surface 12). Once the truck 20 arrives at the parked position, the ICC bar 22 engages the upper surfaces 125 of the side plates 121 and the restraining member 140 is rotated outwardly from the carriage assembly 120 to interlockingly hook the ICC bar 22, as shown, for example, in FIG. 5. In this way, the truck 20 is reliably secured to the loading dock 10 in order to prevent accidental movement away therefrom.

To accommodate trucks 20 with ICC bars 22 of varying heights, the carriage assembly 120 preferably includes a slope extension 130 which is pivotably mounted to the forward end 124 for independent rotational movement with respect to the exposed cam surfaces 127 of the side plates 121. In use, the slope extension 130 allows camming engagement of relatively low ICC bars 22 by providing an extension of cam surfaces 127. Normally, the slope extension assumes an outwardly and downwardly extending pendent position relative to the lower surface 126 of the side plates 121, as shown, for example, in FIGS. 6, 7, and 10–15. In the pendent position, the slope extension 130 extends from the exposed cam surfaces 127 of the side plates 121 and forms a substantially straight line. As shown in FIG. 9, a stop member 132 for the slope extension 130 is also provided at the corner of the forward ends 124 and lower surfaces 126 of the side plates 121. To avoid interference of the slope extension 130 with the roadway surface 10 while the carriage assembly 120 is being lowered, the stop member 132 enables the slope extension 130 to rotate upwardly out of the way. More specifically, the stop member 132 allows the slope extension 130 to rotate upwardly from the pendent position to a raised position, wherein the exposed cam surfaces 127 and the slope extension 130 form an angle less than 180°, but prevents the slope extension 130 from rotating downwardly past the pendent position. The stop member 132 also keeps the forward end 124 of the side plates 121 spaced-apart by a predetermined distance.

Figure 6:
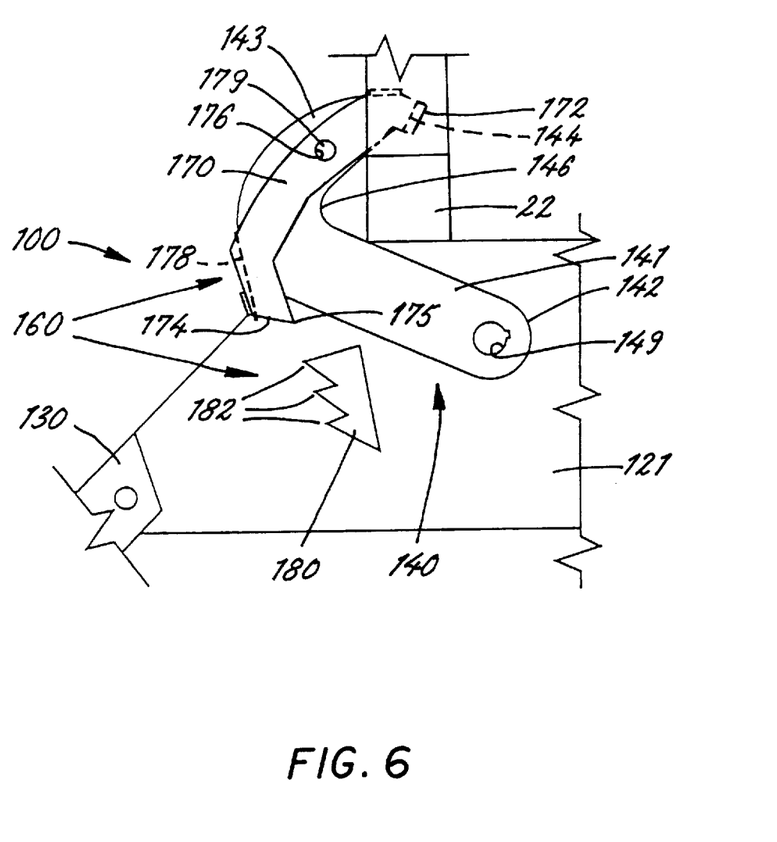
FIG. 6 is an enlarged fragmentary side elevational view of the truck and vehicle restraint depicted in FIG. 5, with a side-plate of the vehicle restraint removed to more clearly show a first embodiment of a locking mechanism for preventing rotation of the restraining member.

In the illustrated embodiment, the restraining member 140 includes a shank portion 141 with a proximal end 142, a leg portion 143 extending at an angle with respect to the shank portion 141 and including a distal end 144, and a throat portion 146 disposed between the proximal and distal ends 142 and 144. In addition, the proximal end 142 of the shank portion 141 has a hole 149 formed therethrough, and the distal end 144 has a generally rectangularly shaped button 145. The restraining member 140 is also pivotably movable between a stored position and an operative position. In the stored position, the distal end 144 of the restraining member 140 is incapable of engaging any portion of the truck 20 because it is substantially enclosed within or concealed by the side plates 121 of the carriage assembly 120, as shown, for example, in FIG. 10. In the operative position, conversely, the distal end 144 of the restraining member 140 projects outwardly from the side plates 121 of the carriage assembly 120, as shown, for example, in FIGS. 5–8A and 11–15, and the throat portion 146 is positioned to interlockingly engage the ICC bar 22 of the truck 20, as shown in FIGS. 5 and 6. When the restraining member 140 interlockingly engages the ICC bar 22 in this way, movement of the truck 20 away from the loading dock 10 causes the throat portion 146 to hook onto the ICC bar 22, thereby providing restraint against further movement of the truck 20 away from the loading dock 10. Accordingly, the stored and operative positions of the restraining member 140 are also referred to as the vehicle-release and vehicle-locking positions, respectively.

As best shown in FIG. 9, the restraining member 140 is pivotably attached between the side plates 121 of the carriage assembly 120 by a transversely extending rotatable shaft 150. In the illustrated embodiment, the shaft 150 engages a pair of journal or sleeve bearings 152 which are fixedly mounted within complementary shaped apertures 128 formed in the side plates 121 by a plurality of bolts or the like (not shown). The shaft 150 is also fixedly received by the hole 149 in the proximal end 142 of the restraining member 140. Although other means of attachment are certainly possible, the restraining member 140 of the illustrated embodiment is fixedly attached to the rotatable shaft 150 by way of a shaft key (not shown) which engages complementary keyways or grooves formed in both the shaft 150 and the hole 149 of the restraining member 140.

In order to selectively rotate the restraining member 140 between the stored and operative positions, the shaft 150 is connected to a reversible motor (not shown). In use, the restraining member 140 rotates in conjunction with the shaft 150, but relative to both the side plates 121 and the journal bearings 152 when the shaft 150 is rotated by the motor. In any event, when the shaft 150 is rotated in the appropriate direction, the restraining member 140 is moved between the stored and operative positions. In order to protect the motor when an external torque is exerted on the restraining member 140, the shaft 150 is preferably provided with a slip clutch (not shown) which allows the shaft 150 and the attached restraining member 140 to rotate against the action of the motor.

In accordance with certain important objects of the present invention, the vehicle restraint 100 is also provided with a locking or anti-rotation mechanism which prevents the restraining member 140 from rotating out of the operative position and into the stored position when an external force or torque 60, in a direction toward the stored position, is exerted on the restraining member 140. The external force or torque 60 described herein may be provided by, inter alia, engagement between the distal end 144 of the restraining member 140 and the ICC bar 22 of a truck 20 which is moving away from the loading dock 10, as indicated by reference numeral 28 in FIG. 8. A first embodiment of the locking mechanism is generally designated by reference numeral 160, as shown in FIGS. 5–9, and a second embodiment of the locking mechanism is generally designated by reference numeral 260, as shown in FIGS. 10–15.

In the first embodiment, the locking mechanism 160 includes a first locking member 170 which is pivotably attached to the restraining member 140 and a second locking member 180 which is fixedly attached to the side plates 121 of the carriage assembly 120. In the illustrated embodiments, the first locking member 170 is in the form of a collar and the second locking member 180 is in the form of a member having one or more ratchet teeth 182 and associated engaging surfaces, as shown, for example, in FIGS. 6, 8, 8A, and 9. More specifically, the first locking member 170 includes a front end 172 which is arranged for partial rotational movement with respect to the distal end 144 of the restraining member 140 and a rear end 174 opposite the front end 172. In order to pivotably attach the first locking member 170 to the restraining member 140, a pivot pin 179 engages holes 176 and 147 formed in both the first locking member 170 and the restraining member 140.

Figure 8:
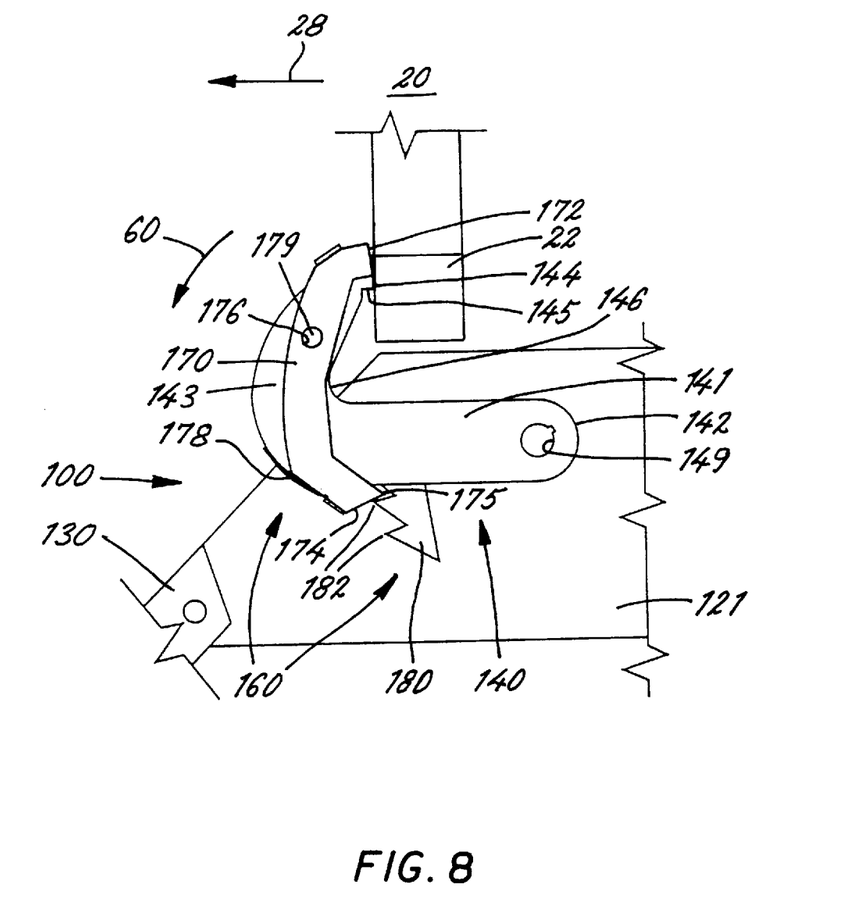
FIG. 8 is an enlarged fragmentary side elevational view of the truck, vehicle restraint, and locking mechanism depicted in FIG. 7, with a side-plate of the vehicle restraint removed in order to more clearly show the locking mechanism.
Figure 8A:
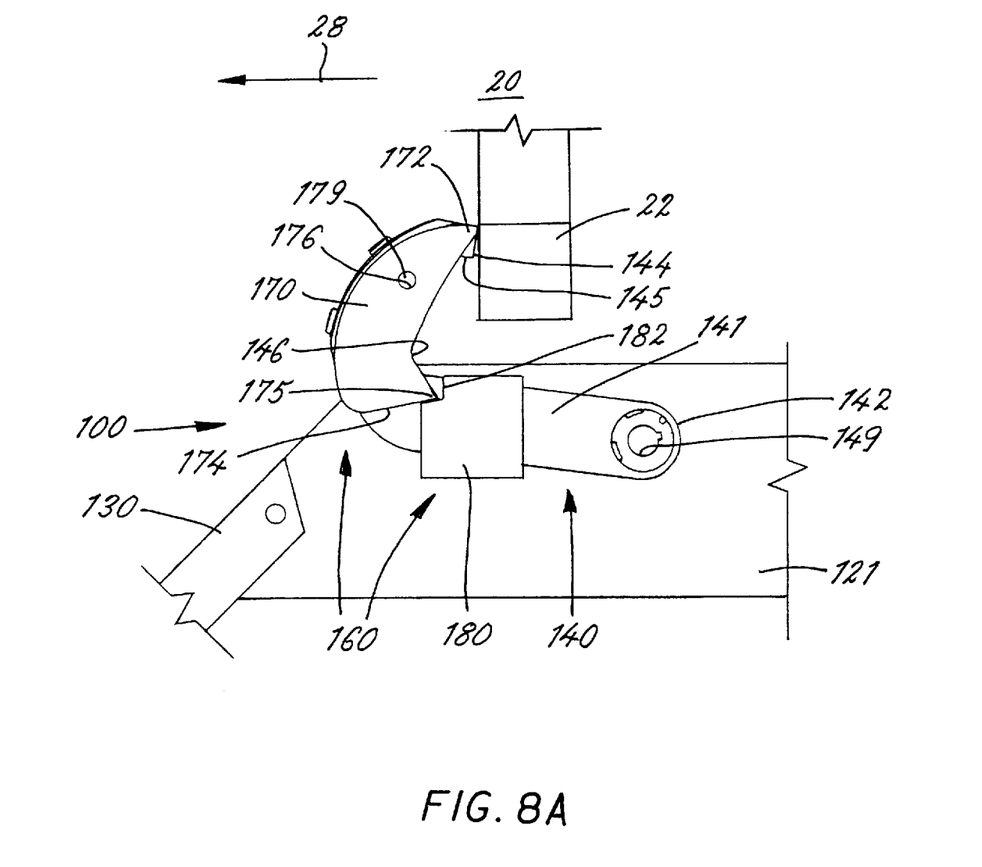
FIG. 8A is an enlarged fragmentary side elevational view of an alternative form of the locking mechanism depicted in FIGS. 5–8.

Depending on its positioning with respect to the restraining member 140, the second locking member 180 is positioned for selective engagement by the first locking member 170 when the restraining member 140 is rotated between the operative and stored positions. In particular, the first locking member 170 is movable between a deactivated (or default) position and an activated position. When the first locking member 170 is in the deactivated position, the front end 172 is spaced outboard of the distal end 144 of the restraining member 140, as shown in FIG. 6, and the rear end 174 is positioned for clearance from the teeth 182 of the second locking member 180 as the restraining member 140 rotates between the stored and operative positions. Conversely, when the first locking member 170 is in the activated position, the front end 172 is substantially flush with or inboard of the distal end 144 of the restraining member 140, as shown in FIGS. 8 and 8A, and the rear end 174 is positioned for engaging the teeth or tooth 182 of the second locking member 180 as the restraining member 140 rotates between the operative and stored positions.

As best shown in FIGS. 6 and 9, the first locking member 170 is biased towards the deactivated position by a biasing member 178 such as a spring compressibly disposed between the rear end 174 of the first locking member 170 and the restraining member 140. The rear end 174 of the first locking member 170 also includes an edge portion 175 which is adapted to engage the teeth or tooth 182 of the second locking member 180 when the first locking member 170 is in the activated position.

In accordance with an important aspect of the present invention, engagement between the edge portion 175 of the first locking member 170 and the teeth or tooth 182 of the second locking member 180 prevents the restraining member 140 from rotating into the stored position when the restraining member 140 is subjected to external torque 60. Referring, for example, to FIGS. 7, 8, and 8A, the ICC bar 22 of the truck 20 is located above the first vertical position of the carriage assembly 120 such that only the distal end 144, and not the throat portion 146, of the restraining member 140 is capable of engaging the ICC bar 22. In this position, movement of the truck 20 away from the loading dock 10 subjects the restraining member 140 to external motion 28 and torque 60, respectively, as shown in FIGS. 8 and 8A, which causes the first locking member 170 to move towards the activated position. As the restraining member 140 rotates in a direction towards the stored position due to the influence of this external torque 60, the edge portion 175 of the first locking member 170 engages one or more engaging surfaces of the teeth or tooth 182 of the second locking member 180 which reliably locks the restraining member 140 in place before it can reach the stored position, as shown in FIGS. 8 and 8A. Thus, even if the throat portion 146 of the restraining member 140 fails to hook the ICC bar 22 of the truck 20, the first embodiment of the locking mechanism 160 advantageously prevents the restraining member 140 from rotating into the stored position and, more importantly, provides a reliable restraint for the truck 20 should it accidentally move away from the loading dock 10.

Of course, when the first locking member 170 is in the deactivated position, the restraining member 140 may freely rotate into the stored position without the edge portion 175 of the first locking member 170 engaging the teeth or tooth 182 of the second locking member 180. When the first locking member 170 is in the activated position, however, the first embodiment of the locking mechanism 160 prevents the restraining member 140 from rotating into the stored position in response to an external torque 60. In this way, the first locking member 170 only engages the second locking member 180 when needed (e.g., when there is non-interlocking engagement between the distal end 144 of the restraining member 140 and the truck 20).

Like the first embodiment, the second embodiment of the locking mechanism 260 prevents the restraining member 140 from rotating out of the operative position when the restraining member 140 is subjected to external force or torque 60. Unlike the first embodiment, however, the locking mechanism 260 of the second embodiment includes a first locking member 270 which is fixedly mounted to the restraining member 140 and a second locking member 280 which is pivotably attached to the side plates 121 of the carriage assembly 120.

Figure 10:
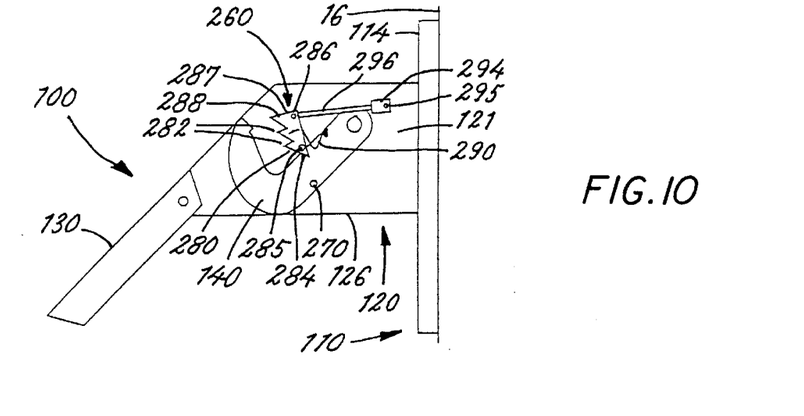
FIG. 10 is a side elevational view of a vehicle restraint in accordance with the present invention, with a side-plate of the vehicle restraint removed in order to more clearly show a second embodiment of the locking mechanism, and the restraining member of the vehicle restraint in a stored or vehicle-release position.
Figure 11:
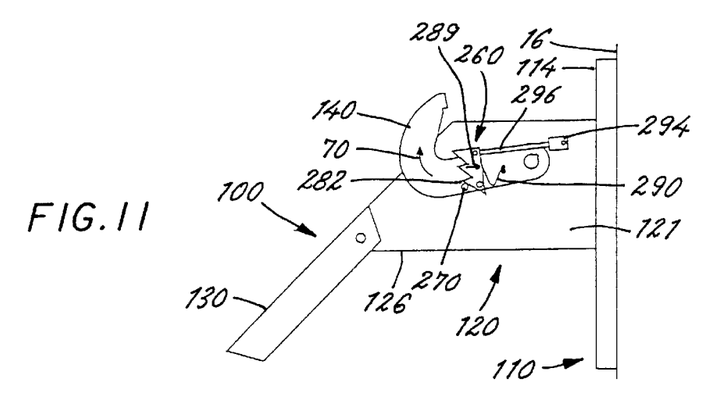
FIG. 11 is a side elevational views of the vehicle restraint depicted in FIG. 10, showing the restraining member in transit from the stored position.

As shown in FIG. 10, the first locking member 270 is in the form of a pin and the second locking member 280 is in the form of a member having one or more ratchet teeth 282 and associated engaging surfaces. The second locking member 280 also includes a lower portion 284 which is pivotably attached to at least one of the side plates 121 of the carriage assembly 120 at pivot point 285, and an upper portion 286 with top surface 288. In operation, the second locking member 280 is pivotably movable about pivot point 285 between an extended position, as shown in FIGS. 10–14, and a retracted position, as shown in FIG. 15. In the extended position, the teeth 282 of the second locking member 280 are positioned for engagement by pin 270 when the restraining member 140 is rotated between the operative and stored positions. In the retracted position, however, the teeth 282 of the second locking member 280 are positioned for clearance from pin 270.

As shown in FIGS. 10–15, a biasing member 290 such as a spring is provided for biasing the second locking member 280 towards the extended position. An actuator 294 is also provided for moving the second locking member 280 into the retracted position by selectively counteracting the biasing provided by spring 290. In the illustrated embodiment, the actuator 294 is pivotably attached to at least one of the side walls 121 of the carriage assembly 120 at pivot point 295 and includes an extendible-retractable arm 296 which is pivotably attached to the upper portion 286 of the second locking member 280 at pivot point 287.

In operation, the spring 290 and the actuator 294 cause the pin 270 to selectively engage the teeth 282 of the second locking member 280 when the restraining member 140 is rotated between the stored and operative positions. For example, when the restraining member 140 is in the stored position, as shown in FIG. 10, the pin 270 is spaced-apart from the teeth 282 of the second locking member 280. When the second locking member 280 is in the extended position and the restraining member 140 is rotated toward away from the stored position as indicated by reference numeral 70 in FIG. 11, however, the pin 270 engages the lowermost tooth 282 of the second locking member 280. This, in turn, causes the second locking member 280 to move toward, but not into, the retracted position as indicated by reference numeral 289. As the restraining member 140 continues to rotate in direction 70, the pin 270 sequentially and camably engages each of the teeth 282 of the second locking member 280, as shown, for example, in FIGS. 12 and 13. Ultimately, the pin 270 may engage the top surface 288 and uppermost tooth 282 of the second locking member 280, as shown in FIG. 14. In this way, the teeth 282 of the second locking member 280 provide a plurality of engagement notches for the pin 270 which, in turn, define a plurality of operative positions for the restraining member 140, as shown in FIGS. 12–14, respectively.

Figure 12:
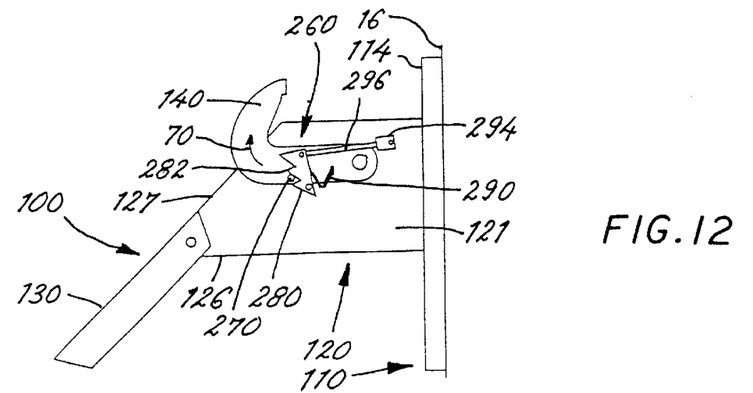
FIG. 12 is a side elevational view of the vehicle restraint depicted in FIGS. 10 and 11, showing the restraining member moving further away from the stored position and in a first operative or vehicle-locking position.
Figure 13:
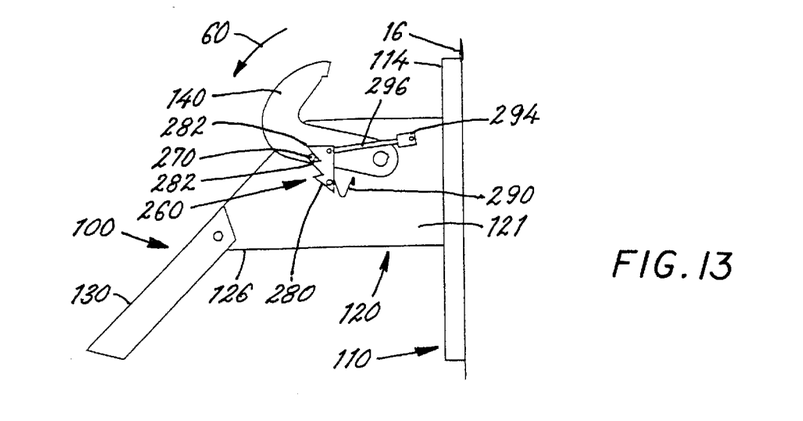
FIG. 13 is a side elevational view of the vehicle restraint depicted in FIGS. 10–12, showing the restraining member in a second operative position and the locking mechanism preventing rotation of the restraining member towards the stored position.
Figure 14:
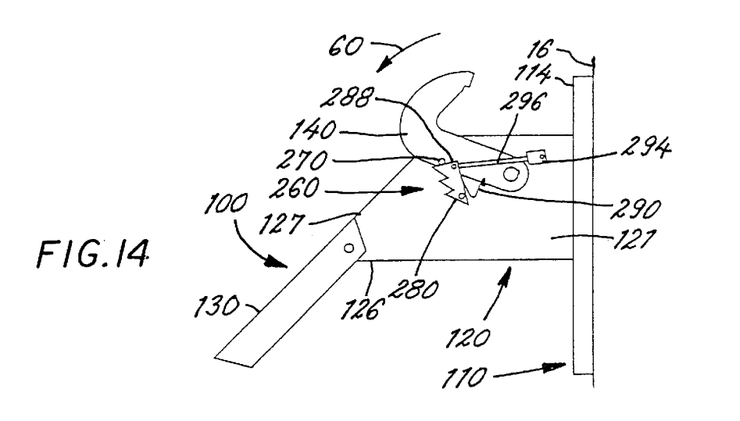
FIG. 14 is a side elevational view of the vehicle restraint depicted in FIGS. 10–13, showing the restraining member in a third operative position and the locking mechanism preventing rotation of the restraining member towards the stored position.
Figure 15:
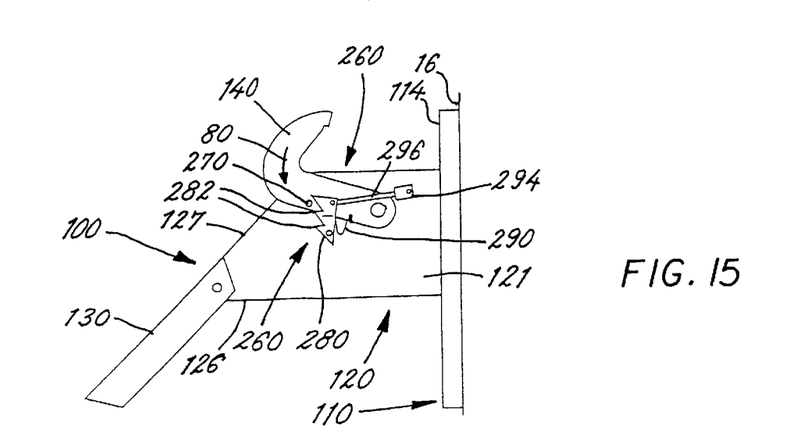
FIG. 15 is a side elevational view of the vehicle restraint depicted in FIGS. 10–14, showing a second locking member of the locking mechanism in a retracted position and the restraining member in transit towards the stored position.

When the restraining member 140 is in any of the operative positions shown in FIGS. 12–14, engagement between the pin 270 and the teeth 282 of the second locking member 280 prevents the restraining member 140 from rotating towards the stored position when an external force or torque 60 is applied to the restraining member 140. When the second locking member 280 is moved into the retracted position by withdrawing the arm 296 of the actuator 294, however, clearance develops between the teeth 282 of the second locking member 280 and the pin 270, as shown in FIG. 15. This clearance permits unobstructed rotation of the restraining member 140 between the operative and stored positions. Thus, when the restraining member 140 is in any of the operative positions shown in FIGS. 12–14 and the second locking member 128 is in the retracted position, the restraining member 140 may be freely rotated towards the stored position, as indicated by reference numeral 80 in FIG. 15.

In this way, the locking mechanism 260 of the second embodiment advantageously prevents uncontrolled rotation of the restraining member 140 in a direction from the operative position towards the stored position, even when the throat portion 146 of the restraining member 140 is unable to interlockingly engage or hook the ICC bar 22 of the truck 20. Indeed, as long as there is suitable engagement between the first and second locking members 270 and 280, the locking mechanism 260 of the second embodiment positionally locks the restraining member 140 in one of its operative positions.

While the present invention has been described and disclosed with an emphasis upon preferred embodiments, it will be understood, of course, that the present invention is not strictly limited thereto. Since modifications may be made to the structures disclosed herein—particularly in light of the foregoing teachings—without departing from the present invention, the following claims are intended to cover all structures that fall within the scope and spirit of the present invention.

What is claimed is:

1. A vehicle restraint for releasably securing a parked vehicle to an adjacent structure, the vehicle restraint comprising:

a carriage assembly mountable to the adjacent structure for substantially vertical movement relative thereto;

a restraining member pivotably attached to the carriage assembly for movement between a stored position wherein the restraining member is enclosed within the carriage assembly and an operative position wherein a portion of the restraining member projects outwardly from the carriage assembly;

a first locking member coupled to the restraining member for movement relative to the restraining member between a deactivated position and an activated position a second locking member coupled to the carriage assembly and positioned for selective engagement by the first locking member when the restraining member is rotated between the operative and stored positions, the first locking member engaging the second locking member when in the activated position, and clearing the second locking member when in the deactivated position; and a biasing member for biasing the first locking member to the deactivated position, the first locking member being disposed to move to the activated position by contact with the vehicle being restrained.

2. The vehicle restraint of claim 1, wherein the restraining member is substantially hook-shaped and includes a pivotably attached shank portion with a proximal end, a leg portion with a free distal end, and a throat portion disposed between the proximal and distal ends.

3. The vehicle restraint of claim 1, wherein the second locking member is fixedly attached to the carriage assembly and includes at least one engaging surface.

4. The vehicle restraint of claim 3, wherein the first locking member includes front and rear ends, is pivotably attached to the restraining member, and is movable between a deactivated position, wherein the rear end is positioned for clearance from said at least one engaging surface of the second locking member so that the restraining member may freely move between the operative and stored positions, and an activated position, wherein the rear end is positioned for engagement by said at least one engaging surface of the second locking member so that the restraining member may not move between the operative and stored positions without the rear end engaging said at least one engaging surface of the second locking member.

5. The vehicle restraint of claim 1, wherein the first locking member includes a rear end and the biasing member is compressibly disposed between the restraining member and the rear end of the first locking member.

6. The vehicle restraint of claim 5, wherein the rear end of the first locking member includes an edge portion which engages said at least one engaging surface of the second locking member and positionally locks the restraining member in place when the first locking member is in the activated position and the restraining member is rotated from the operative position towards the stored position.

7. The vehicle restraint of claim 1, further comprising:

a slope extension pivotably mounted on the carriage assembly for independent rotational movement with respect to the carriage assembly, the slope extension normally assuming an outwardly and downwardly extending pendent position relative to a lower portion of the carriage assembly, the slope extension forming a substantially coplanar extension of an exposed cam surface of the carriage assembly when in the pendent position.

* * * * *